(12) United States Patent
Kim et al.

(10) Patent No.: US 11,631,861 B2
(45) Date of Patent: Apr. 18, 2023

(54) NEGATIVE ACTIVE MATERIAL FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Young-Min Kim, Yongin-si (KR); Changsu Shin, Yongin-si (KR); Jongmin Won, Yongin-si (KR); Dae-Hyeok Lee, Yongin-si (KR); Jaemyung Kim, Yongin-si (KR); Jaehou Nah, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 217 days.

(21) Appl. No.: 17/084,983

(22) Filed: Oct. 30, 2020

(65) Prior Publication Data

US 2021/0143439 A1 May 13, 2021

(30) Foreign Application Priority Data

Nov. 7, 2019 (KR) .......................... 10-2019-0142040

(51) Int. Cl.
| | |
|---|---|
| *H01M 4/66* | (2006.01) |
| *H01M 4/38* | (2006.01) |
| *H01M 4/583* | (2010.01) |
| *H01M 10/0525* | (2010.01) |
| *H01M 4/02* | (2006.01) |

(52) U.S. Cl.
CPC .......... *H01M 4/667* (2013.01); *H01M 4/386* (2013.01); *H01M 4/583* (2013.01); *H01M 4/663* (2013.01); *H01M 10/0525* (2013.01); *H01M 2004/027* (2013.01); *H01M 2004/028* (2013.01); *H01M 2300/0094* (2013.01)

(58) Field of Classification Search
CPC ...... H01M 4/386; H01M 4/583; H01M 4/663; H01M 4/667; H01M 10/0525; H01M 2004/027; H01M 2300/0094
See application file for complete search history.

(56) References Cited

U.S. PATENT DOCUMENTS

| | | | |
|---|---|---|---|
| 2013/0189582 A1* | 7/2013 | Lee ...................... | H01M 4/387 977/948 |
| 2014/0147741 A1 | 5/2014 | Shin et al. | |

(Continued)

FOREIGN PATENT DOCUMENTS

| | | |
|---|---|---|
| EP | 3131140 A1 | 2/2017 |
| KR | 10-2014-0067520 A | 6/2014 |

(Continued)

OTHER PUBLICATIONS

European Search Report dated Mar. 15, 2021.

*Primary Examiner* — Ula C Ruddock
*Assistant Examiner* — Scott J Chmielecki
(74) *Attorney, Agent, or Firm* — Lee IP Law, P.C.

(57) ABSTRACT

A negative active material for a rechargeable lithium battery and a rechargeable lithium battery including the same, the negative active material including a Si-carbon composite that includes Si nanoparticles and an amorphous carbon, wherein the negative active material has a sphericity of 0.7 or more, and a BET specific surface area of 10 m²/g or less.

13 Claims, 12 Drawing Sheets

(56) References Cited

U.S. PATENT DOCUMENTS

| | | | |
|---|---|---|---|
| 2015/0270536 A1 | 9/2015 | Kawakami et al. | |
| 2016/0254537 A1* | 9/2016 | Kamo | H01M 4/48 |
| | | | 429/231.8 |
| 2016/0268591 A1* | 9/2016 | Choi | H01M 4/1395 |
| 2017/0084913 A1 | 3/2017 | Misaki et al. | |
| 2018/0097229 A1* | 4/2018 | Jo | H01M 4/62 |
| 2019/0393488 A1* | 12/2019 | Tzeng | H01M 4/366 |

FOREIGN PATENT DOCUMENTS

| | | |
|---|---|---|
| KR | 10-2014-0094676 A | 7/2014 |
| KR | 10-2018-0036456 A | 4/2018 |
| WO | WO 2015-146864 A1 | 10/2015 |

* cited by examiner

NEGATIVE ACTIVE MATERIAL FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2019-0142040, filed on Nov. 7, 2019, in the Korean Intellectual Property Office, and entitled: "Negative Active Material for Rechargeable Lithium Battery and Rechargeable Lithium Battery Comprising Same," is incorporated by reference herein in its entirety.

BACKGROUND

1. Field

Embodiments relate to a negative active material for a rechargeable lithium battery and a rechargeable lithium battery including the same.

2. Description of the Related Art

A rechargeable lithium battery has recently drawn attention as a power source for small portable electronic devices. The rechargeable lithium battery may use an organic electrolyte solution and may have a two times or higher discharge voltage than a battery using an alkali aqueous solution, and accordingly, may have high energy density.

A positive active material of a rechargeable lithium battery may include a lithium-transition metal oxide having a structure capable of intercalating lithium ions, such as $LiCoO_2$, $LiMn_2O_4$, $LiNi_{1-x}Co_xO_2$ (0<x<1), or the like.

The above information disclosed in this Background section is only for enhancement of understanding of the background, and therefore it may contain information that does not form the prior art that is already known in this country to a person of ordinary skill in the art.

SUMMARY

The embodiments may be realized by providing a negative active material for a rechargeable lithium battery, the negative active material including a Si-carbon composite that includes Si nanoparticles and an amorphous carbon, wherein the negative active material has a sphericity of 0.7 or more, and a BET specific surface area of 10 m²/g or less.

The sphericity may be 0.7 to 1.

The BET specific surface area may be 0.5 m²/g to 10 m²/g.

The Si nanoparticles may have a spherical shape.

The Si-carbon composite may include secondary particles that are agglomerated Si nanoparticles.

The amorphous carbon may cover a surface of the Si nanoparticles.

The amorphous carbon may cover a surface of the secondary particles.

The amorphous carbon may fill pores between the Si nanoparticles.

The Si nanoparticles may be a flake type.

The Si nanoparticles may have a particle diameter of about 10 nm to about 200 nm.

A full width at half maximum, FWHM (111) of a diffraction peak at a (111) plane found by X-ray diffraction of the Si nanoparticles using a CuKα ray may be about 0.3 degrees (°) to about 7 degrees (°).

The negative active material may have a D50 average particle diameter of about 40 μm or less.

A mixing ratio of the Si nanoparticles and the amorphous carbon may be about 8:2 to about 2:8 by weight.

The embodiments may be realized by providing a rechargeable lithium battery including a negative electrode comprising the negative active material according to an embodiment; a positive electrode; and an electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
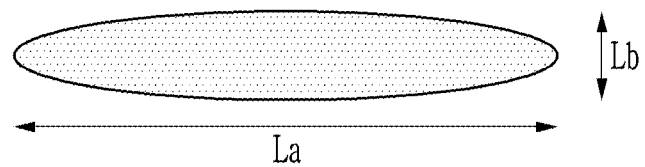
FIG. 1 is a drawing for defining sphericity of a negative active material.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

A negative active material for a rechargeable lithium battery may include a Si-carbon composite. The Si-carbon composite may include Si nanoparticles and an amorphous carbon.

A sphericity (e.g., aspect ratio) of the negative active material may be, e.g., about 0.7 or more. In an implementation, the sphericity may be, e.g., about 0.7 to 1.0. The sphericity refers to a ratio (Lb/La) of a length of a short axis to a length of a long axis, as shown in FIG. 1, if the negative active material has a spherical or oval shape. As illustrated in FIG. 1, e.g., a particle may have an oval shape. In an implementation, if the sphericity is about 1.0, that indicates a negative active material having substantially a completely spherical shape (e.g., a length of the short axis may be about the same as a length of the long axis).

Maintaining the sphericity of the negative active material at about 0.7 or more may help ensure that the surface area of the negative active material is reduced, resulting in decreases in an area at which the negative active material contacts an electrolyte, or an area with which lithium reacts, so that a side reaction with the electrolyte may be reduced, and a reaction with lithium may also be reduced. In addition, the active material in the negative electrode may facilitate uniform expansion, thereby reducing the volume expansion caused therefrom.

The effects owing to such a decrease in the surface area may be more effectively obtained from a negative active material having a BET specific surface area of about 10 m$^2$/g or less, e.g., about 0.5 m$^2$/g to about 10 m$^2$/g. Maintaining the specific surface area BET of the negative active material at about 10 m$^2$/g or less, e.g., about 0.5 m$^2$/g to 10 m$^2$/g, may help ensure that the contact with the electrolyte may be reduced to inhibit the side reaction, thereby helping to improve the performance and increasing the initial efficiency.

In an implementation, the negative active material having sphericity of about 0.7 or more, and a specific surface area BET of 10 m$^2$/g or less, may be an active material with reduced side reactivity with the electrolyte and with lithium.

If one of the sphericity and the specific surface area BET of the negative active material described above were not satisfied, the volume expansion of the active material could be increased, the initial efficiency could be reduced, or the cycle-life characteristics could be deteriorated.

In the negative active material, the Si nanoparticles may be primary particles, and the primary particles, e.g., at least one of primary particles, may be agglomerated to form a secondary particle which may be included in the Si-carbon composite. In an implementation, the Si-carbon composite may include secondary particles in which the (e.g., primary) Si nanoparticles are agglomerated.

In an implementation, the Si nanoparticles may have a flake shape, a spherical shape, or the like. In an implementation, the secondary particles (in which at least one of primary particles is agglomerated) may have a spherical shape (e.g., may have a sphericity of about 1.0).

In an implementation, the amorphous carbon may cover a surface of the secondary particle. In an implementation, the negative active material may include a core including Si nanoparticles, e.g., a secondary particle core in which at least one of primary particles (e.g., the Si nanoparticles) is agglomerated, and an amorphous carbon surrounding the core. In an implementation, the core indicates a region positioned inside of the active material, e.g., the core may be surrounded with the amorphous carbon, so that it indicates a region which is not substantially exposed to an outside of the active material. In an implementation, the core may be a region inside of the amorphous carbon surrounding the core.

In an implementation, the amorphous carbon may be filled between the primary particles (e.g., may fill pores between the primary particles within the secondary particle). In an implementation, the amorphous carbon may be filled between the primary particles to resultantly cover the surface of the primary particles. As described above, when the amorphous carbon is filled between the primary particles, a pore volume of the negative active material may be reduced to inhibit the side-reaction of the electrolyte and to act to buffer the expansion of the primary particles being the Si nanoparticles. In an implementation, the amorphous carbon filled between the primary particles may serve as a binder to help prevent breakage of the negative active material particles and to help improve the conductivity.

The amorphous carbon may be soft carbon, hard carbon, mesophase pitch carbide, a sintered coke, or a combination thereof.

The Si nanoparticles may be of a flake type. In an implementation, the Si particles may be of a flake type having a long axis and a short axis, e.g., the Si particles may have an aspect ratio (long axis/short axis, e.g., width/thickness) of about 5 to about 20. When the aspect ratio of the Si particle is within the above range, the volume expansion of the Si nanoparticles may be suppressed, thereby improving the cycle-life characteristics and the initial efficiency of the battery.

The Si particles may have a particle diameter of, e.g., about 10 nm to about 200 nm. The particle diameter may be an average particle diameter of the particle diameters. When the Si nanoparticles may be of a flake type, the particle diameter may be a length of the long axis. Herein, the average a particle diameter may be a particle diameter D50 which is measured by cumulative volume. Such a particle diameter D50 indicates an average particle diameter D50 where a cumulative volume is about 50 volume % in a particle distribution, when a definition is not otherwise provided. When the size of the Si nanoparticles is within the above range, the side reaction of the negative active material and the electrolyte may be suppressed and the expansion of the Si nanoparticles may be reduced, thereby improving the cycle-life characteristics and the initial efficiency of the battery.

In an implementation, when the Si nanoparticles are secondary particles in which at least one of primary particles is agglomerated, a D50 average particle diameter of the secondary particles may be, e.g., about 2 μm to about 15 or about 5 μm to about 10 μm. In an implementation, the D50 average particle diameter of the primary particles may be about 10 nm to about 200 nm. When the average particle diameter of the negative active material is within the above range, lithium ions may be easily distributed inside of the negative active material and the electrical resistance and rate-capability may be improved.

The average particle size D50 may be measured by a suitable technique, e.g., using a particle size analyzer, transmission electron microscope photography, or scanning electron microscope photography. Another method may be performed by measuring it using a measuring device with dynamic light scattering, analyzing data to count a number of particles relative to each particle size, and then calculating to obtain an average particle diameter D50.

In an implementation, a full width at half maximum, FWHM (111), of a diffraction peak at a (111) plane found by X-ray diffraction of the Si particles using a CuKα ray may be about 0.3 degrees (°) to about 7 degrees (°). When the full width at half maximum, FWHM(111), of the Si particles is within the range, the cycle-life characteristics may be improved.

The X-ray diffraction analysis is produced under a measurement condition of $2\theta=40°$ to $50°$, a scan speed (°/S) of 0.04 to 0.06, and a step size (°/step) of 0.01 to 0.03 by using a CuKα ray as a target ray.

A mixing ratio of the Si nanoparticle and the amorphous carbon may be, e.g., about 8:2 to 2:8 by weight, or about 7:3 to 5:5 by weight. In an implementation, as the Si nanoparticles are present as secondary particles in which they are agglomerated, in the negative active material, the mixing ratio of the Si nanoparticles and the amorphous carbon may resultantly also be a mixing ratio of the secondary particles and the amorphous carbon. When the mixing ratio of the Si nanoparticles and the amorphous carbon is within the above range, excellent capacity, e.g., higher capacity relative to the crystalline carbon negative active material may be realized.

In an implementation, the amorphous carbon may be present as a coating layer coating the surface of the secondary particles, or may be present as a filling form between the primary particles, together with the coating layer. Regardless of the presence form of filling the amorphous carbon between the primary particles or coating layer, a total amount of the amorphous carbon included in the negative active material may be, e.g., about 20 wt % to about 80 wt %, based on a total weight (100 wt %) of the negative active material.

In an implementation, when the amorphous carbon is the coating layer coating the surface, the coating layer of the amorphous carbon may have a thickness of about 1 nm to about 1,000 nm, e.g., about 30 nm to about 200 nm, on a surface of the secondary particles. When the thickness of the amorphous carbon is within the range, the conductivity of the negative active material may be improved and the contact with the electrolyte may be reduced, thereby effectively inhibiting the resistance increase due to the side reactant generation.

In an implementation, a D50 average particle diameter of the negative active material may be about 40 μm or less, e.g. may be about 2 μm to about 15 μm. When the D50 average particle diameter of the negative active material is within the range, the lithium ions may be easily distributed inside of the negative active material, and the battery resistance and rate-capability characteristics may be improved.

The negative active material may be prepared according to the following procedure.

First, silicon particles may be prepared. The silicon particles may be nanoparticles, e.g., may be nanoparticles with a D50 average particle diameter of about 10 nm to about 200 nm. Such silicon particles of the nanoparticles may be obtained from a suitable technique for preparing nanoparticles, such as pulverization, etc. A full width at half maximum, FWHM (111), of a diffraction peak at a (111) plane found by X-ray diffraction of the Si particles using a CuKα ray may be about 0.3 degrees (°) to about 7 degrees (°).

The silicon particles may be dispersed in a solvent to prepare a dispersed liquid of the silicon particles. As the solvent, alcohols that do not oxidize silicon particles, and are easily volatilized, may be used, and examples thereof may include isopropyl alcohol, ethanol, methanol, butanol, or a combination thereof. The dispersed liquid of the silicon particles may have a concentration of about 10 wt % to about 30 wt %.

The obtained dispersion liquid of the silicon particles may be spray dried. During the process, the silicon particles with a nanometer (primary particle) size may be agglomerated to prepare spherical Si secondary particles (e.g., with a micrometer size). The secondary particles may include pores inside, e.g., gaps between the primary particles. The spray-drying may be performed by controlling a nozzle type and an atmosphere to control the sphericity of the obtained negative active material. In an implementation, as the nozzle, a two-fluid nozzle being capable of preparing fine particles by mixing liquid and vapor may be suitably used. In case of using the two-fluid nozzle, fine and spherical particles may be prepared and no additional pulverization may be required as the prepared particle size is small, to maintain the spherical shape. If a disk-type nozzle for spraying while a rotator is rotated, is used, massive particles may be prepared, and additional pulverization may be performed to reduce the particle size, and various shapes of particles such as spherical, oval, or donut shapes may be prepared.

In an implementation, the spray-drying may be suitably performed under a $N_2$ atmosphere, e.g., a flow rate of about 40 L/min to about 50 L/min of $N_2$, or of about 30 L/min to about 40 L/min of $N_2$. When the flow rate of $N_2$ during the spray-drying is within the range, the microparticles with a spherical shape having a predetermined size may be prepared. If the flow rate of $N_2$ were to be less than about 30 L/min, the sprayed products may be agglomerated again, and the prepared particle size may be increased. If the flow rate were to be greater than about 50 L/min, the prepared particle size could be very small, and the fine particles could be largely prepared.

The spray-drying may be performed at about 120° C. to about 170° C. When the spray-drying is performed in the temperature range, the spherical Si particles with a microsize may be sufficiently dried through the instant evaporation.

The Si secondary particles with a micrometer size, in which Si nano-sized primary particles are agglomerated, may be mixed with an amorphous carbon. In an implementation, a mixing ratio of the secondary particles and the amorphous carbon may be about 80:20 to 20:80 by weight, e.g., about 60:40 to about 50:50 by weight.

The amorphous carbon precursor may include, e.g., a polyimide resin, a furan resin, a phenol resin, a polyvinyl alcohol resin, a poly(meth)acrylic acid resin, polyurethane resin, a cellulose resin, an epoxy resin, a polystyrene resin, a petroleum pitch, coal pitch, green cokes, mesophase pitch, coal oil, petroleum heavy oil, cokes, or a combination thereof.

The obtained mixture may be compression-formed, e.g., compressed. The compression-formation may be performed under a pressure that is sufficient to maintain the Si secondary particles with a micrometer size to be a spherical shape, e.g., about 20 MPa to about 150 MPa. In an implementation, the compression-formation may be performed for 1 minute to 5 minutes. The compression-formation may facilitate firm adherence of the spherical Si secondary particles with a micrometer size to the amorphous carbon precursor, and insertion of the amorphous carbon precursor between the primary particles. In an implementation, the amorphous carbon precursor may be well inserted into the pores formed inside the secondary particles, so that the amorphous carbon may be between the primary particles in the final active material at a desired amount (desired thickness), and thus, the amorphous carbon may be formed as a coating layer on the surface of the secondary particles at a desired thickness. If the compress-formation were not performed, the adherence of the spherical secondary particles with the micrometer size to the amorphous carbon precursor may not be firmly produced, and the amorphous carbon precursor may not be well inserted between the primary particles, e.g., may be largely present on the surface of the secondary particles, so that the amorphous carbon may be on the surface of the secondary particles in the final negative active material at an extremely thick thickness.

The obtained compress-formation product may be heat-treated to prepare a negative active material for a rechargeable lithium battery. The heat-treatment may be performed at about 400° C. to about 1,200° C., e.g., about 700° C. to about 1,000° C. When the heat treatment is performed in the temperature range, the shape of the negative active material may be maintained as a spherical shape, and the amorphous carbon may be carbonized to improve the conductivity of the negative active material and the initial efficiency of the battery. In an implementation, the heat treatment may be performed under a $N_2$ atmosphere. The heat treatment may facilitate conversion of the amorphous carbon precursor to amorphous carbon, thereby including it in the negative active material as an amorphous carbon.

According to one embodiment, a rechargeable lithium battery including a negative electrode, a positive electrode, and an electrolyte may be provided.

The negative electrode may include a current collector and a negative active material layer on the current collector, and the negative active material may include the negative active material according to one embodiment.

The negative active material layer may further include a crystalline carbon negative active material. The crystalline carbon negative active material may be graphite, e.g., unspecified shaped, sheet-shaped, flake-shaped, spherical-shaped or fiber-shaped natural graphite or artificial graphite.

When the negative active material layer includes the negative active material according to one embodiment as a first negative active material, and the crystalline carbon negative active material as a second negative active material, a mixing ratio of the first negative active material to the second negative active material may be about 1:99 to 20:80 by weight. When the first negative active material is within the range, the battery capacity may be more effectively improved.

In the negative active material layer, the negative active material may be included in an amount of 95 wt % to 99 wt %, based on the total weight of the negative active material layer.

The negative active material layer may include a negative active material and a binder, and may further include a conductive material. In the negative active material layer, an amount of the binder may be about 1 wt % to about 5 wt % based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may adhere negative active material particles to each other well and may also adhere negative active materials to the current collector. The binder may include a non-water-soluble binder, a water-soluble binder, or a combination thereof.

The non-water-soluble binder may include an ethyl propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, an acrylonitrile-butadiene rubber, an acryl rubber, a butyl rubber, a fluorine rubber, an ethylene oxide included polymer, polyvinylpyrrolidone, polyepichlorohydrin, polyphosphazene, an ethylene propylene copolymer, polyvinylpyridine, chloro sulfonated polyethylene, latex, a polyester resin, an acryl resin, a phenol resin, an epoxy resin, polyvinyl alcohol, or a combination thereof When the water-soluble binder is used as a negative electrode binder, a cellulose compound may be further included to adjust viscosity, e.g., as a thickener. The cellulose compound may include carboxymethyl cellulose, hydroxypropyl methyl cellulose, methyl cellulose, or alkali metal salts thereof. The alkali metals may be Na, K, or Li. The thickener may be included in an amount of 0.1 parts by weight to 3 parts by weight, based on 100 parts by weight of the negative active material.

The conductive material may be included to provide electrode conductivity, and a suitable electrically conductive material that does not cause a chemical change may be used. Examples of the conductive material include a carbon material such as natural graphite, artificial graphite, carbon black, acetylene black, ketjen black, denka black, a carbon fiber, and the like; a metal material of a metal powder or a metal fiber including copper, nickel, aluminum, silver, and the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, or a combination thereof.

In an implementation, the negative electrode may be prepared by mixing a negative active material, a binder, and optionally a conductive material in a solvent to prepare an active material composition, and coating the composition on a current collector. The solvent may be water.

The positive electrode may include a positive current collector and a positive active material layer on the positive current collector.

The positive active material may include compounds that reversibly intercalate and deintercalate lithium ions (lithiated intercalation compounds). In an implementation, it may include a composite oxide cobalt, manganese, nickel, or a combination thereof, and lithium. Examples may be compounds represented by one of the following chemical formulae. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.5, 0≤α<2); $Li_aNi_{1-b-c}Co_bX_cO_{2-\alpha}T_2$ (0.90≤a≤1.8, 0≤b≤0.5, 0≤c≤0.5, 0≤α<2); $Li_aNi_{1-b-c}Mn_bX_cD_\alpha$ (0.90≤a≤1.8, 0≤b≤0.5, 0≤c≤0.5, 0≤α≤2); $Li_aNi_{1-b-c}Mn_bX_cO_{2-\alpha}T_\alpha$ (0.90≤a≤1.8, 0≤b≤0.5, 0≤c≤0.5, 0≤α≤2); $Li_aNi_{1-b-c}Mn_bX_cO_{2-\alpha}T_2$ (0.90≤a≤1.8, 0≤b≤0.5, 0≤c≤0.5, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g ≤0.5); $QO_2$; $QS_2$; $LiQS_2$; $V_2O_5$; $LiV_2O_5$; $LiZO_2$; $LiNiVO_4$; $Li_{(3-f)}J_2 PO_{43}$ (0≤f≤2); $Li_{(3-f)}Fe_2 PO_{43}$ (0≤f≤2); and $Li_aFePO_4$ (0.90<a≤1.8).

In the chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

The compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like.

In the positive electrode, an amount of the positive active material may be 90 wt % to 98 wt %, based on the total weight of the positive active material layer.

In an implementation, the positive active material layer may further include a binder and a conductive material. In an implementation, each amount of the binder and the conductive material may be about 1 wt % to about 5 wt %, respectively, based on a total weight of the positive active material layer.

The binder may help improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity. A suitable electrically conductive material that does not cause a chemical change in a battery may be used. Examples of the conductive material include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may be, e.g., an aluminum foil, a nickel foil, or a combination thereof.

The positive electrode may be prepared mixing a positive active material, a binder, and optionally a conductive material in a solvent to prepare an active material composition and coating the active material composition on a current collector. The solvent may include, e.g., N-methylpyrrolidone.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, t-butyl acetate, methylpropionate, ethylpropionate, propylpropionate, γ-butyrolactone, decanolide, valerolactone, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include cyclohexanone or the like. The alcohol solvent may include ethanol, isopropyl alcohol, or the like. The aprotic solvent may include nitriles such as R-CN (wherein R is a hydrocarbon group having a C2 to C20 linear, branched, or cyclic structure and may include a double bond, an aromatic ring, or an ether bond) and the like, dioxolanes such as 1,3-dioxolane and the like, and sulfolanes or the like.

The non-aqueous organic solvent may be used alone or in a mixture. When the organic solvent is used in a mixture, the mixture ratio may be controlled in accordance with a desirable battery performance.

The carbonate solvent may be a mixture of a cyclic carbonate and a chain carbonate. In this case, the cyclic carbonate and the chain carbonate may be mixed and used in a volume ratio of 1:1 to 1:9, such that the performance of the electrolyte may be improved.

When the non-aqueous organic solvent is used in a mixture, a mixed solvent of a cyclic carbonate and a chain carbonate; a mixed solvent of a cyclic carbonate and a propionate solvent; or a mixed solvent of a cyclic carbonate, a chain carbonate, and a propionate solvent may be used. The propionate solvent may include, e.g., methyl propionate, ethyl propionate, propyl propionate, or a combination thereof In an implementation, when the cyclic carbonate and the chain carbonate or the cyclic carbonate and the propionate solvent are mixed, they may be mixed in a volume ratio of about 1:1 to about 1:9, and performance of an electrolyte solution may be improved. In an implementation, when the cyclic carbonate, the chain carbonate, and the propionate solvent are mixed, they may be mixed in a volume ratio of about 1:1:1 to about 3:3:4. The mixing ratios of the solvents may be appropriately adjusted according to desired properties.

The non-aqueous organic solvent may further include an aromatic hydrocarbon organic solvent in addition to the carbonate solvent. Herein, the carbonate solvent and the aromatic hydrocarbon organic solvent may be mixed in a volume ratio of about 1:1 to about 30:1.

The aromatic hydrocarbon organic solvent may be an aromatic hydrocarbon compound of Chemical Formula 1.

[Chemical Formula 1]

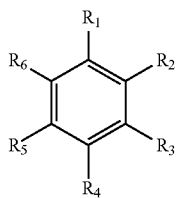

In Chemical Formula 1, $R_1$ to $R_6$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 2 as an additive for improving the cycle-life of a battery.

[Chemical Formula 2]

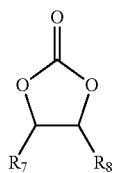

In Chemical Formula 2, $R_7$ and $R_8$ may each independently be, e.g., hydrogen, a halogen, a cyano group (CN), a nitro group ($NO_2$), and a fluorinated C1 1 to C5 alkyl group. In an implementation, at least one of $R_7$ and $R_8$ may be a halogen, a cyano group (CN), a nitro group (NO2), or a fluorinated C1 to C5 alkyl group, and both of $R_7$ and $R_8$ are not hydrogen.

Examples of the ethylene carbonate compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving the cycle-life may be used within an appropriate range.

The electrolyte may further include vinylethylene carbonate, propane sultone, succinonitrile, or a combination thereof, and the amount thereof may be suitably controlled.

The lithium salt dissolved in the organic solvent may supply lithium ions in a battery, may facilitate a basic operation of a rechargeable lithium battery, and may help improve transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2$ (in which x and y are a natural number, e.g., an integer of 0 to 20), lithium difluoro(bisoxolato) phosphate, LiCl, LiI, LiB$(C_2O_4)_2$ (lithium bis(oxalato) borate: LiBOB), and lithium difluoro(oxalato) borate (LiDFOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

A separator may be between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, a polypropylene/polyethylene/polypropylene triple-layered separator, and the like.

Figure 2:
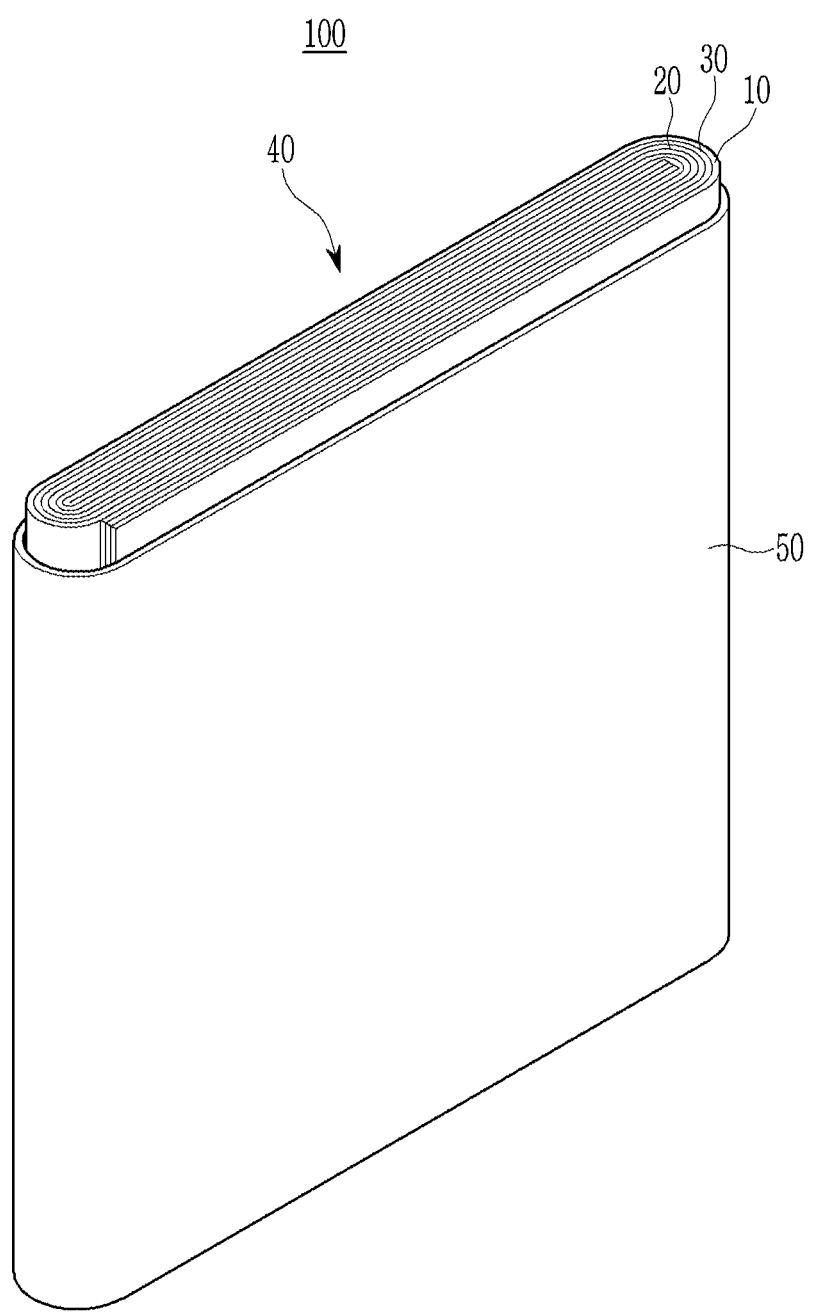
FIG. 2 is an exploded perspective view of a structure of a rechargeable lithium battery according to one embodiment.

FIG. 2 is an exploded perspective view of a lithium secondary battery according to an embodiment. As illustrated in FIG. 2, the lithium secondary battery may be a prismatic battery, or may include variously-shaped batteries such as a cylindrical or pouch-type battery.

Referring to FIG. 2, a lithium secondary battery 100 according to an embodiment may include an electrode assembly 40 manufactured by winding a separator 30 between a positive electrode 10 and a negative electrode 20, and a case 50 housing the electrode assembly 40. The positive electrode 10, the negative electrode 20, and the separator 30 may be impregnated with an electrolyte solution.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Si particles were pulverized to prepare Si nanoparticles having an average particle diameter D50 of 100 nm. The Si nanoparticles were of a flake type and had an aspect ratio (width/thickness) of 20. A full width at half maximum, FWHM (111), of a diffraction peak of the Si nanoparticles was measured by X-ray diffraction using a CuKα ray and was 1.11 degrees (°).

The prepared Si nanoparticles were added to an isopropyl alcohol solvent to prepare a liquid of Si particles with a concentration of 15 wt %.

The Si particle-included liquid was spray-dried at 120° C. while $N_2$ was provided at a flow rate of 50 L/min, using a two-fluid nozzle to prepare secondary particles having an average a particle diameter D50 of 6 μm in which the Si nano-sized primary particles with an average particle diameter D50 of 100 nm were agglomerated.

40 wt % of the prepared secondary particle and 60 wt % of a petroleum pitch were mixed and then the mixture was compressed under a 20 MPa pressure for 3 minutes.

The obtained compressed product was heat-treated at 1,000° C. under a $N_2$ atmosphere to prepare a first negative active material.

The prepared first negative active material included secondary particles with an average particle diameter D50 of 6 μm (in which the Si nano-sized primary particles with an average particle diameter D50 of 100 nm were agglomerated), and a soft carbon amorphous carbon coating layer was formed on the exterior of the secondary particle by coating it on the surface of the secondary particle. The first negative active material included soft carbon as an amorphous carbon filled (e.g., in pores) between the primary particles. The amounts of the Si nanoparticles, e.g., the secondary particles was 60 wt % based on the total of 100 wt % of the first negative active material, and the amount of the amorphous carbon was 40 wt %, based on a total weight (100 wt %) of the first negative active material. The amorphous carbon coating layer coated on the surface of the secondary particles had a thickness of 30 nm. The produced first negative active material had a BET specific surface area of 3.2 $m^2/g$.

98 wt % of a mixed active material of the first negative active material and a natural graphite second negative active material (15:83 weight ratio), 1 wt % of a styrene-butadiene rubber binder and 1 wt % of a carboxymethyl cellulose as an agent for increasing viscosity were mixed in a water solvent to prepare a negative active material slurry. The produced negative active material slurry was coated on a Cu current collector, dried, and compressed to produce a negative electrode including a negative active material layer on the current collector.

Using the negative electrode, a lithium metal counter electrode and an electrolyte, a half-cell having a capacity of 500 mAh/g was fabricated. As the electrolyte, a 1.5M $LiPF_6$ solution in a mixed solvent of ethylene carbonate, dimethyl carbonate and ethyl methyl carbonate (20:40:40 volume ratio) was used.

Example 2

A first active material was prepared by the same procedure as in Example 1, except that the spray-drying was performed by flowing $N_2$ at a flow rate of 45 L/min.

The prepared first negative active material included secondary particles with an average a particle diameter D50 of 5.5 μm (in which the Si nano-sized primary particles with an average a particle diameter D50 of 100 nm were agglomerated), and a soft carbon amorphous carbon coating layer on the exterior of the secondary particle by coating it on the surface of the secondary battery. The first negative active material included soft carbon as an amorphous carbon filled between the primary particles. The amounts of the Si nanoparticles, e.g., the secondary particles, was 60 wt % based on the total weight of the first negative active material, and the amount of the amorphous carbon was 40 wt % based on the total weight of the first negative active material. The amorphous carbon coating layer coated on the surface of the secondary particle had a thickness of 30 nm. The produced first negative active material had a BET specific surface area of 2.7 $m^2/g$.

98 wt % of a mixed active material of the first negative active material and a natural graphite second negative active material (15:83 weight ratio), 1 wt % of a styrene-butadiene rubber binder and 1 wt % of a carboxymethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode and an electrolyte, a half-cell was fabricated. As the electrolyte, a 1.5M $LiPF_6$ solution in a mixed solvent of ethylene carbonate, dimethyl carbonate, and ethyl methyl carbonate (20:40:40 volume ratio) was used.

Example 3

A first active material was prepared by the same procedure as in Example 1, except that the spray-drying was performed by flowing $N_2$ at a flow rate of 40 L/min.

The prepared first negative active material included secondary particles with an average particle diameter D50 of 5 μm (in which the Si nano-sized primary particles with an average particle diameter D50 of 100 nm were agglomerated), and a soft carbon as an amorphous carbon coating layer on the exterior of the secondary particles by coating it on the surface of the secondary battery. The first negative active material included soft carbon as an amorphous carbon filled between the primary particles. The amount of the Si nanoparticles, e.g., the secondary particles was 60 wt % based on the total weight of the first negative active material, and the amount of the amorphous carbon was 40 wt % based on the total weight of the first negative active material. The amorphous carbon coating layer coated on the surface of the secondary particles had a thickness of 30 nm. The produced first negative active material had a BET specific surface area of 2.7 $m^2/g$.

98 wt % of a mixed active material of the first negative active material and a natural graphite second negative active material (15:83 weight ratio), 1 wt % of a styrene-butadiene rubber binder, and 1 wt % of a carboxymethyl cellulose as an agent for increasing viscosity were mixed in a water solvent to prepare a negative active material slurry. The produced negative active material slurry was coated on a Cu current collector, dried, and compressed to produce a negative electrode including a negative active material layer formed on the current collector.

Using the negative electrode, a lithium metal counter electrode, and an electrolyte, a half-cell was fabricated. As the electrolyte, a 1.5M $LiPF_6$ solution in a mixed solvent of ethylene carbonate, dimethyl carbonate and ethyl methyl carbonate (20:40:40 volume ratio) was used.

Comparative Example 1

A first active material was prepared by the same procedure as in Example 1, except that the spray-drying was performed by flowing $N_2$ of a flow rate of 45 L/min using a disk-type nozzle, instead of the two-fluid nozzle, and the obtained spray product was pulverized with a pulverizer and the pulverized product was mixed with a petroleum pitch. The obtained spray product secondary particles with an average particle diameter D50 of 30 μm in which primary particles with an average particle diameter D50 of 100 nm were agglomerated.

The prepared first negative active material included secondary particles with an average a particle diameter D50 of 5.5 μm (in which the Si nano-sized primary particles with an average particle diameter D50 of 100 nm were agglomerated), and a soft carbon amorphous carbon coating layer on the exterior of the secondary particle by coating it on the surface of the secondary battery. The first negative active material included soft carbon amorphous carbon filled between the primary particles. The amount of the Si nanoparticles, e.g., the secondary particles was 60 wt % based on the total weight of the first negative active material, and the amount of the amorphous carbon was 40 wt % based on the total weight of the first negative active material.

The produced first negative active material had a BET specific surface area of 11.5 m²/g.

Comparative Example 2

A secondary particle with an average particle diameter D50 of 6 μm in which Si nano-sized primary particles with an average particle diameter D50 of 100 nm were agglomerated, as the same procedure as in Example 1.

Regarding the secondary particles, chemical vapor deposition (CVD) was performed using methane gas at 1,000° C. to prepare a first negative active material.

The prepared first negative active material included secondary particles with an average particle diameter D50 of 6 μm (in which the Si nano-sized primary particles with an average particle diameter D50 of 100 nm were agglomerated), and a soft carbon as an amorphous carbon coating layer formed on the exterior of the secondary particle by coating it on the surface of the secondary battery. The first negative active material included soft carbon as an amorphous carbon filled between the primary particles. The amount of the Si nanoparticles, e.g., the secondary particles, was 60 wt % based on the total weight of the first negative active material, and the amount of the amorphous carbon was 40 wt % based on the total weight of the first negative active material. The amorphous carbon coating layer coated on the surface of the secondary particles had a thickness of 30 nm. The produced first negative active material had a BET specific surface area of 18.2 m²/g.

* SEM Measurement

Figure 3A:
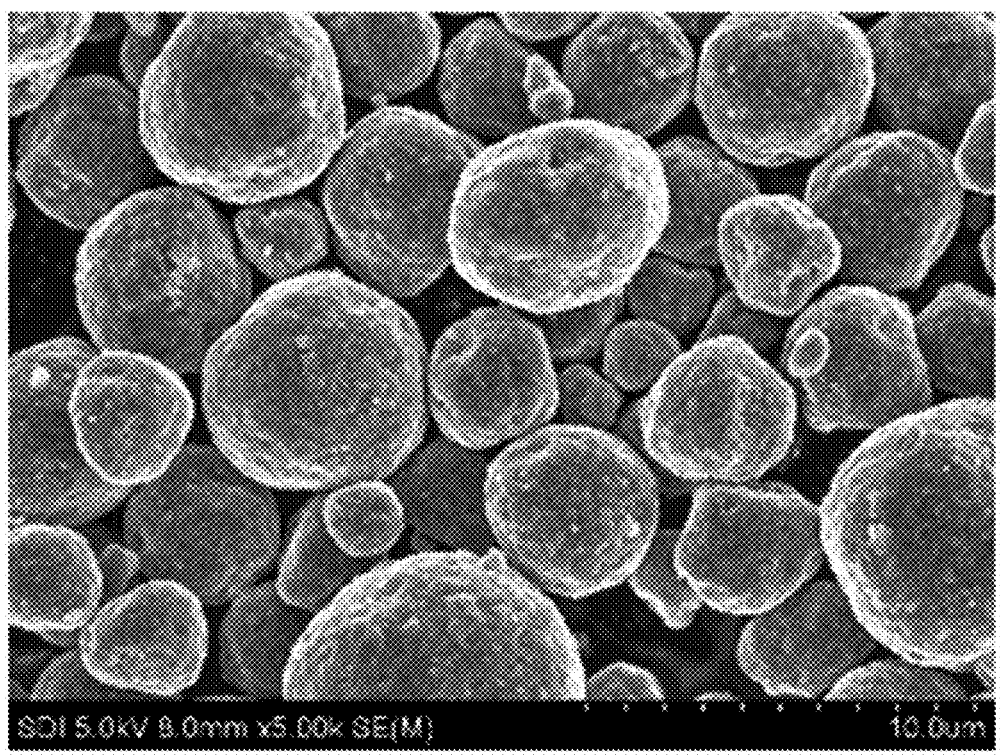
FIG. 3A is a 5,000× magnified SEM image of the first negative active material according to Example 1.
Figure 3B:
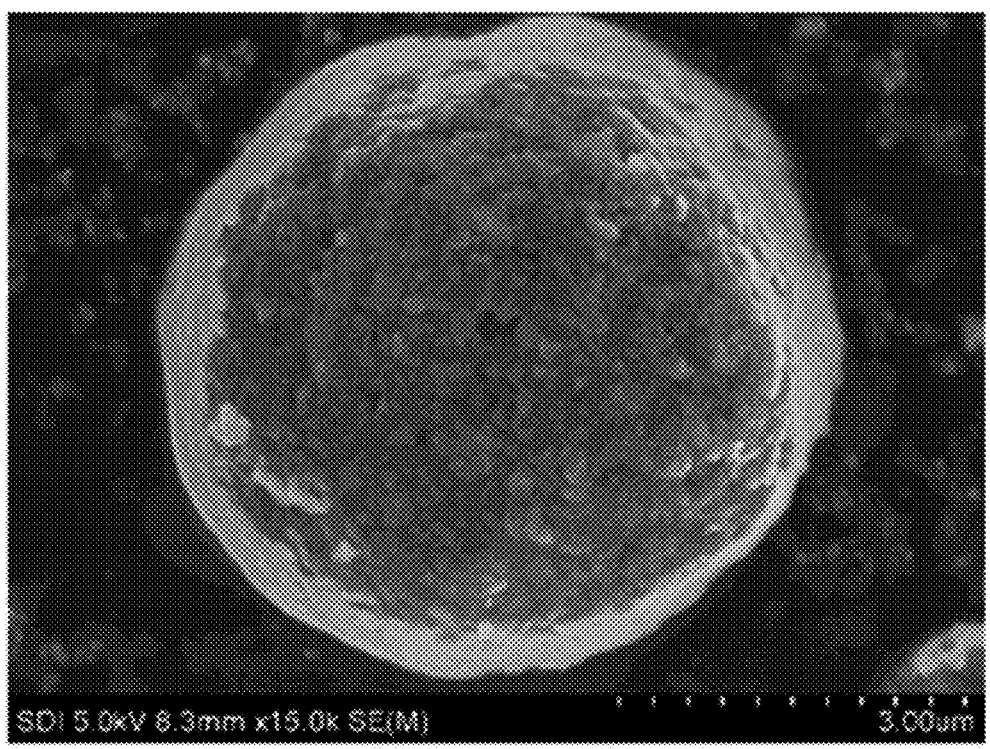
FIG. 3B is a 15,000× magnified SEM image of the first negative active material according to Example 1.
Figure 3C:
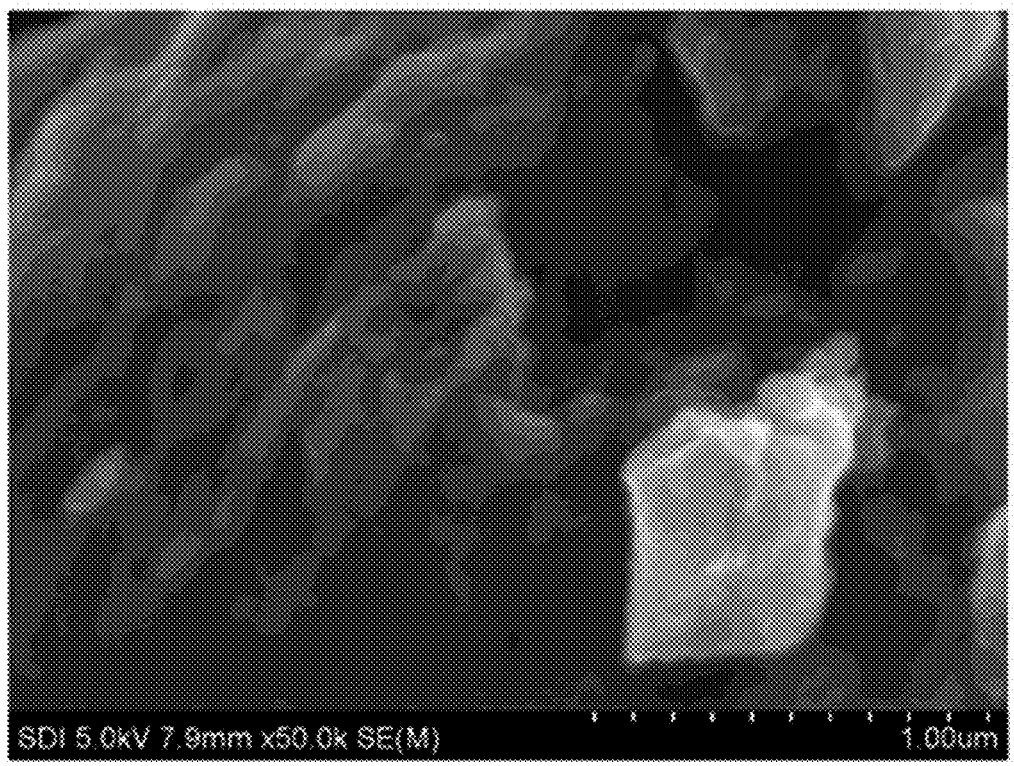
FIG. 3C is a 50,000× magnified SEM image of the first negative active material according to Example 1.

Regarding the shape and the surface of the first negative active material of Example 1, a 5,000× SEM image, a 15,000× SEM image, and a 50,000× SEM image were obtained. The images are shown in FIG. 3A, FIG. 3B, and FIG. 3C. As shown in FIG. 3A and FIG. 3B, the first negative active material according to Example 1 was a spherical negative active material, and had the secondary particles in which the Si nanoparticles with a nanometer size were agglomerated.

As shown in FIG. 3C, the negative active material according to Example 1 had a smooth surface.

Figure 4A:
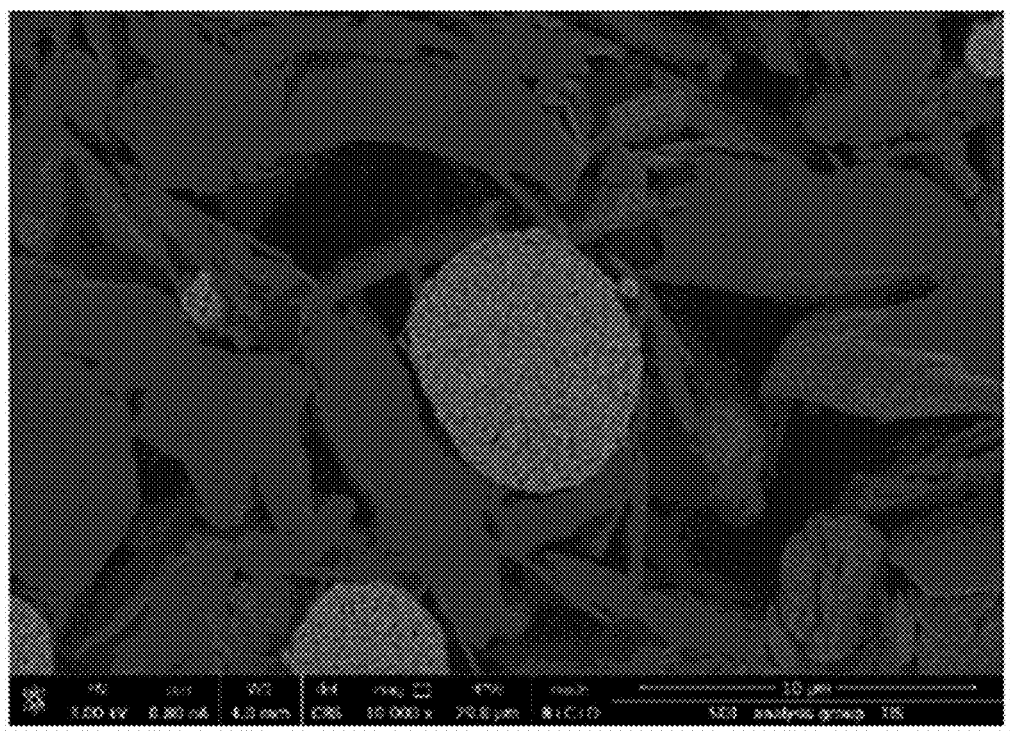
FIG. 4A is a 10,000× magnified SEM image of the cross-section of the negative electrode according to Example 1 recorded by using a CP-SEM (controlled pressure scanning electron microscope).
Figure 4B:
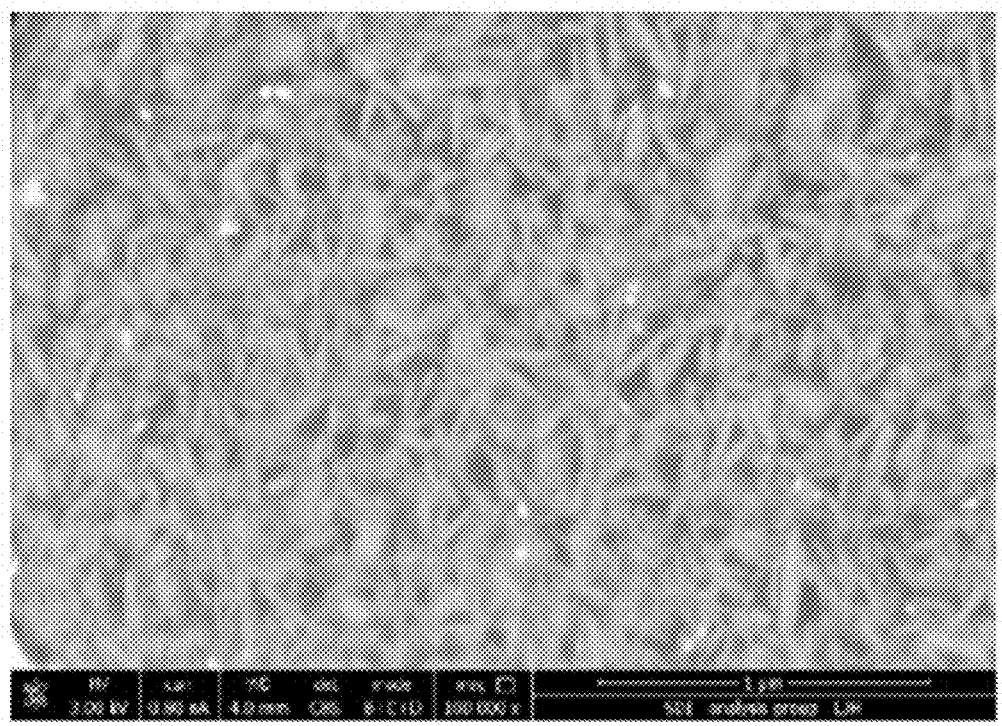
FIG. 4B is a 100,000× magnified SEM image which largely show the spherical shape material shown in FIG. 4A.

A SEM image of a cross-section was obtained by cutting the negative electrode of Example 1, with a CP-SEM (controlled pressure scanning electron microscope). A 10,000× SEM image of the negative active material layer of Example 1 is shown in FIG. 4A. A 100,000× SEM image, in which the spherical material shown in FIG. 4A as a bright color (white color) was magnified, is shown in FIG. 4B. The spherical material shown in FIG. 4A as a bright color was the first active material, and the flake-type material shown around the material as a black color was a graphite second active material. As shown in FIG. 4B in which the spherical material was shown, it may be seen that the flake-type Si primary particles were agglomerated to form the secondary particles, and the shape of the negative active material was well maintained in the negative electrode as a spherical shape. It may be seen that the average particle diameter D50 of the Si primary particles was 100 nm, from FIG. 4B.

Figure 5:
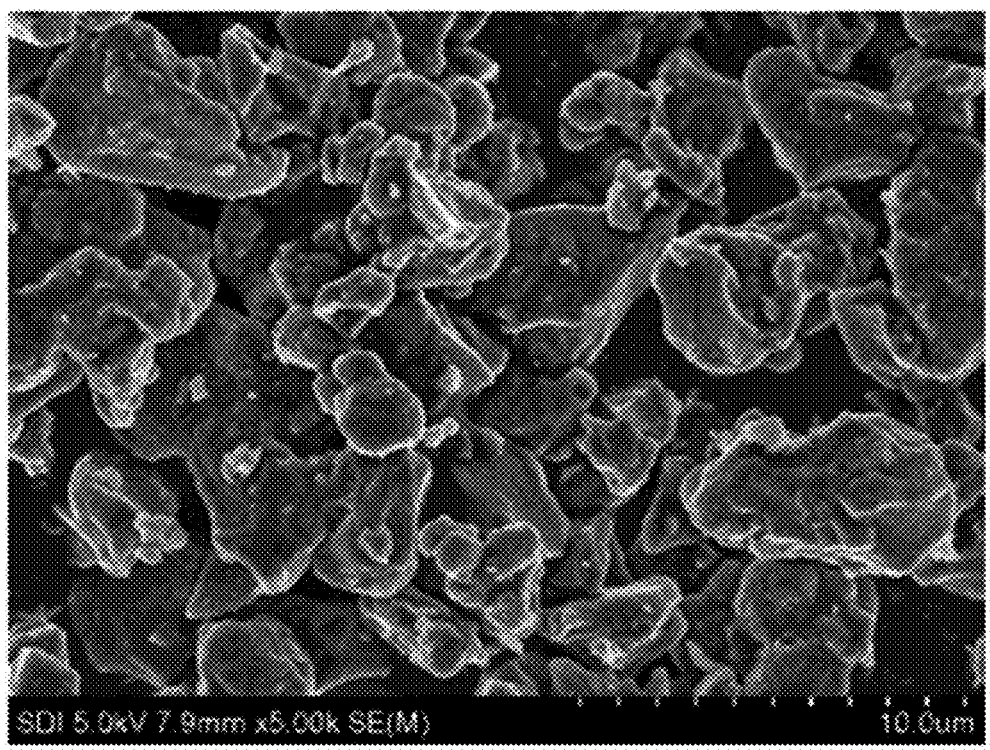
FIG. 5 is a 5,000× magnified SEM image of the first negative active material according to Comparative Example 1.
Figure 6A:
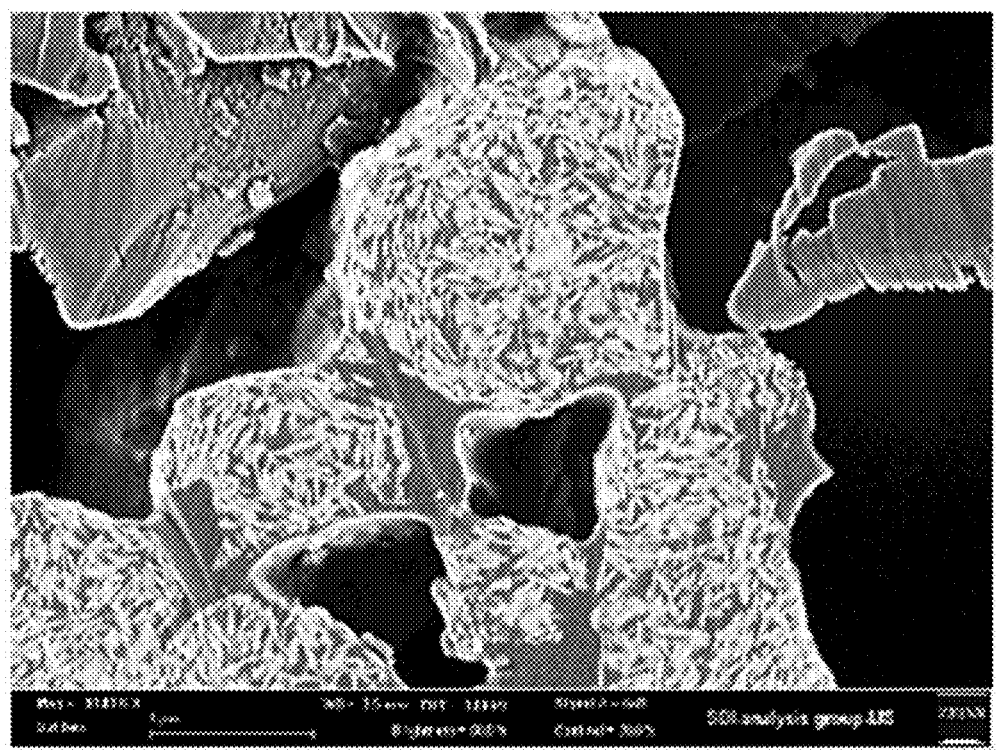
FIG. 6A is a 50,000× magnified SEM image of the cross-section of the negative electrode according to Comparative Example 1 recorded by using a CP-SEM (controlled pressure scanning electron microscope).
Figure 6B:
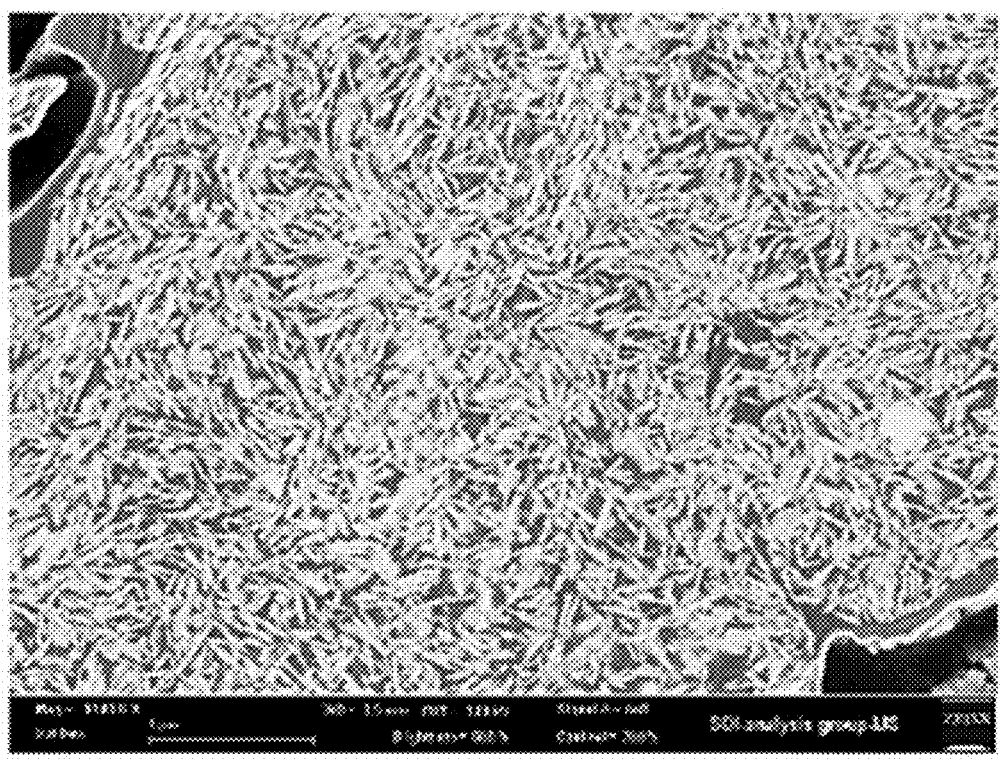
FIG. 6B is a 100,000× magnified SEM image of the negative active material layer.

A 5,000× SEM image of the shape and the surface of the first negative active material of Comparative Example 1 is shown in FIG. 5. The SEM image was obtained after cutting the negative electrode of Comparative Example 1, with a CP-SEM (controlled pressure scanning electron microscope). A 50,000× SEM image of the negative active material layer of Comparative Example 1 is shown in FIG. 6A, and a 100,000× SEM image of the negative active material layer of Comparative Example 1 is shown in FIG. 6B.

As may be seen in FIG. 5, the first negative active material prepared using the disk-type nozzle according to Comparative Example 1 had an irregular shape. This is considered to be because the massive secondary particles with the average particle diameter of 30 μm were prepared so that the pulverization was performed to reduce the particle size. As shown in FIG. 6A and FIG. 6B, the first negative active material of Comparative Example 1 had the secondary particles in which the primary particles were agglomerated, in the negative electrode, but the irregular shape was maintained, not any spherical shape.

Figure 7A:
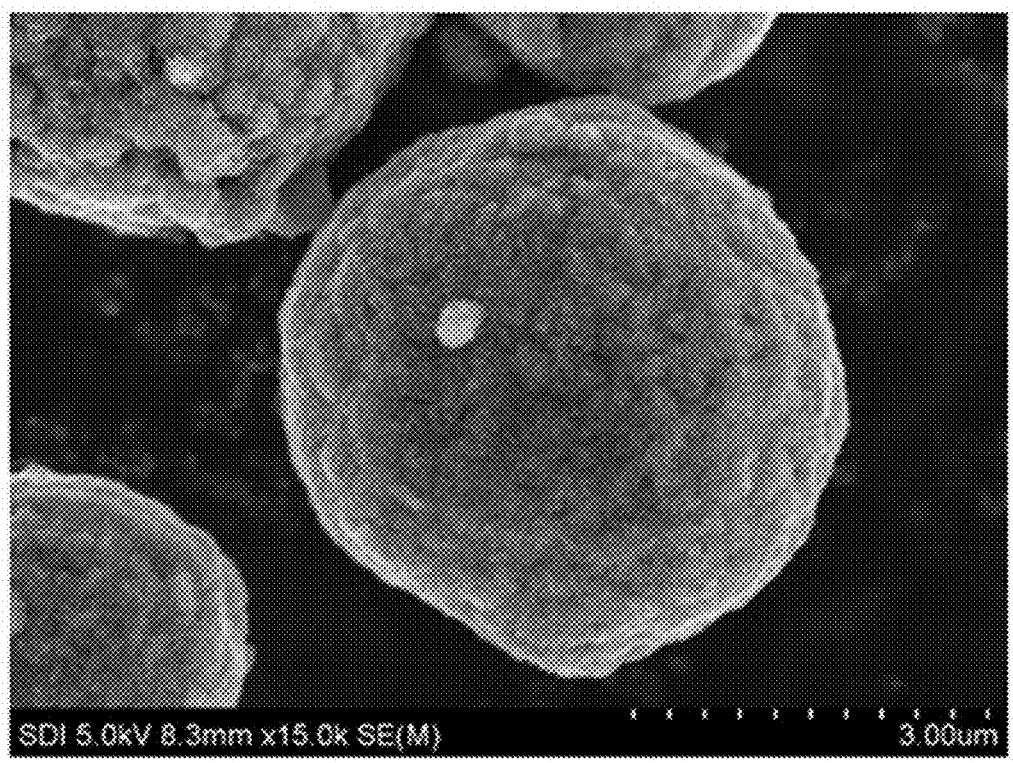
FIG. 7A is a 15,000× magnified SEM image of the first negative active material according to Comparative Example 2.
Figure 7B:
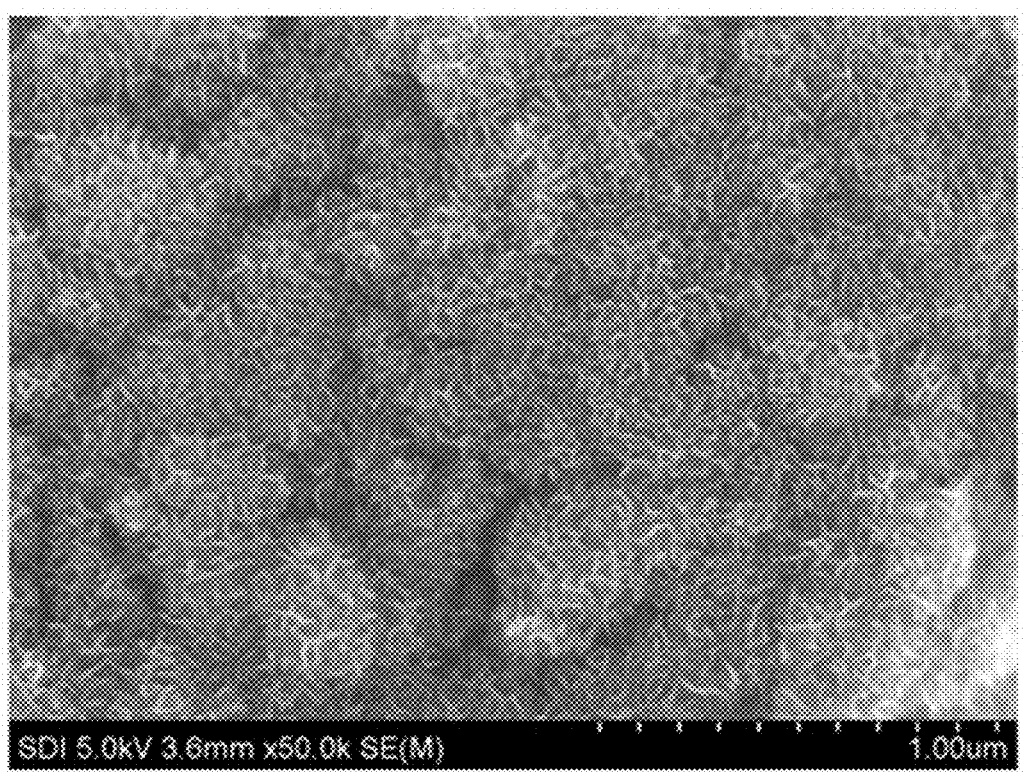
FIG. 7B is a 50,000× magnified SEM image of the first negative active material according to Comparative Example 2.

A 15,000× SEM image and a 5,000× SEM image of the shape and the surface of the first negative active material of Comparative Example 2 are shown in FIG. 7A and FIG. 7B, respectively. As shown in FIG. 7A, the negative active material of Comparative Example 2 had the slightly similar shape as shown in the SEM image of FIG. 3A (Example 1), so that it is considered that the negative active material of Comparative Example 2 was a spherical negative active material and had the secondary particles in which the primary particles with nanometer sizes were agglomerated. However, from FIG. 7B (showing the 50,000× SEM image), the surface was very crude and rough, compared to the first active material having the smooth surface of Example 1.

* Measurement for Sphericity

The sphericity of the first negative active materials according to Examples 1 to 3 and Comparative Examples 1 and 2 were identified by a SEM and obtained by averaging the ratio (Lb/La) of the length of the short axis (Lb) to the length of the long axis (La). The results are shown in Table 1.

* Measurement of Initial Efficiency

The half-cells according to Examples 1 to 3 and Comparative Examples 1 and 2 were charged and discharged at 0.1 C one time, and the initial efficiency which was the ratio of the discharge capacity to the charge capacity was measured. The results are shown in Table 1.

* Measurement of Battery Expansion Rate

The half-cells according to Examples 1 to 3 and Comparative Examples 1 and 2 were charged and discharged at 0.5 C 100 times. The battery thickness before charging and discharging and the battery thickness after charging and discharging were measured, respectively, and an expansion rate was determined using Equation 1. The results are shown in Table 1.

Expansion rate (%)=[(battery thickness after charging and discharging-battery thickness before charging and discharging)/battery thickness before charging and discharging]*100   [Equation 1]

* Evaluation of Cycle-Life

The half-cells according to Examples 1 to 3 and Comparative Examples 1 and 2 were charged and discharged at 0.5 C 100 times, and the ratio of the $100^{th}$ discharge capacity to the 1st discharge capacity was determined. The results are shown in Table 1, as capacity retention.

TABLE 1

|  | Sphericity of first negative active material (short axis/long axis) | BET specific surface area ($m^2/g$) | Initial efficiency (%) | Expansion rate (%) | Capacity retention (%) |
|---|---|---|---|---|---|
| Comparative Example 1 | 0.61 | 11.5 | 88.6 | 41 | 68.7 |
| Comparative Example 2 | 0.85 | 18.2 | 88.3 | 52 | 51.3 |
| Example 1 | 0.86 | 3.2 | 90.5 | 23 | 82.9 |
| Example 2 | 0.81 | 2.7 | 90.7 | 22 | 83.7 |
| Example 3 | 0.74 | 7.1 | 90.1 | 27 | 81.2 |

As may be seen in Table 1, the half-cells according to Examples 1 to 3 (using the first negative active material having the sphericity of 0.7 or more and the BET specific surface area of 10 $m^2/g$ or less) exhibited excellent initial efficiency and capacity retention, and very low expansion rate.

The half-cell according to Comparative Example 1 (using the first negative active material having the sphericity of less than 0.7 and the BET specific surface area of more than 10 $m^2/g$) exhibited very low initial efficiency, significantly deteriorated capacity retention, and very high expansion rate.

The half-cell according to Comparative Example 2 (using the first negative active material having the sphericity of 0.7 or more, and a very high BET specific surface area of 18.2 $m^2/g$), exhibited slightly low initial efficiency, a very high expansion rate, and the lowest capacity retention.

By way of summation and review, a negative active material may include various carbon negative active materials such as artificial graphite, natural graphite, hard carbon, or the like. Such a carbon negative active material may have low capacity (e.g., about 360 mAh/g), a silicon negative active material (having a capacity of 2,500 mAh/g or more, which is four or more times higher than the carbon negative active material) has been considered. Silicon may have severe volume expansion which may occur during the charging and the discharging (300% relative to graphite), compared to the carbon negative active material, e.g., graphite, and it may cause the side reaction with the electrolyte to severely occur, thereby consuming the electrolyte solution and resultantly deteriorating the cycle-life characteristic.

One or more embodiments may provide a negative active material for a rechargeable lithium battery exhibiting suppressed volume expansion, and excellent initial efficiency and cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material comprising a Si-carbon composite that includes Si nanoparticles and an amorphous carbon,
    wherein the negative active material has:
    a sphericity of 0.7 or more, and
    a BET specific surface area of 2.7 $m^2/g$ to 7.1 $m^2/g$.

2. The negative active material for a rechargeable lithium battery as claimed in claim 1, wherein the Si nanoparticles have a spherical shape.

3. The negative active material for a rechargeable lithium battery as claimed in claim 1, wherein the Si-carbon composite includes secondary particles that are agglomerated Si nanoparticles.

4. The negative active material for a rechargeable lithium battery as claimed in claim 1, wherein the amorphous carbon covers a surface of the Si nanoparticles.

5. The negative active material for a rechargeable lithium battery as claimed in claim 3, wherein the amorphous carbon covers a surface of the secondary particles.

6. The negative active material for a rechargeable lithium battery as claimed in claim 3, wherein the amorphous carbon fills pores between the Si nanoparticles.

7. The negative active material for a rechargeable lithium battery as claimed in claim 1, wherein the Si nanoparticles are a flake type.

8. The negative active material for a rechargeable lithium battery as claimed in claim 1, wherein the Si nanoparticles have a D50 average particle diameter of about 10 nm to about 200 nm.

9. The negative active material for a rechargeable lithium battery as claimed in claim 1, wherein a full width at half maximum, FWHM (111) of a diffraction peak at a (111) plane found by X-ray diffraction of the Si nanoparticles using a CuKα ray is about 0.3 degrees)(°) to about 7 degrees)(°).

10. The negative active material for a rechargeable lithium battery as claimed in claim 1, wherein the negative active material has a particle diameter of about 40 μm or less.

11. The negative active material for a rechargeable lithium battery as claimed in claim 1, wherein a mixing ratio of the Si nanoparticles and the amorphous carbon is about 8:2 to about 2:8 by weight.

12. A rechargeable lithium battery, comprising:
    a negative electrode comprising the negative active material as claimed in claim 1;
    a positive electrode; and
    an electrolyte.

13. The negative active material for a rechargeable lithium battery as claimed in claim 1, wherein the negative active material is prepared by:
    preparing silicon particles;
    dispersing the silicon particles in a solvent;
    spray drying the dispersed silicon particles in the solvent to form secondary particles;
    mixing the secondary particles with an amorphous carbon precursor to form a mixture;
    compression forming the mixture to form a compress-formation product;
    heat treating the compress-formation product to form the negative active material.

* * * * *